United States Patent [19]
Casement et al.

[11] Patent Number: 5,672,058
[45] Date of Patent: Sep. 30, 1997

[54] HUMAN PRE-NATAL DEVELOPMENT DOLLS

[76] Inventors: Jeffrey L. Casement, P.O. Box 903, La Veta, Colo. 81055; Lisa E. Malloy, 2128 C. Ravenglass Pl., Raleigh, N.C. 27612

[21] Appl. No.: 674,132

[22] Filed: Jul. 1, 1996

Related U.S. Application Data

[63] Continuation-in-part of Ser. No. 352,873, Dec. 12, 1994, abandoned.

[51] Int. Cl.⁶ ................................................. G09B 23/28
[52] U.S. Cl. ................................................. 434/267; 434/262
[58] Field of Search ................................. 434/262, 267, 434/273, 295; 446/369, 372, 268; D19/62; D21/149, 166, 168

[56] References Cited

U.S. PATENT DOCUMENTS

| | | |
|---|---|---|
| D. 347,655 | 6/1994 | Munro . |
| 3,699,707 | 10/1972 | Sapkus . |
| 3,797,130 | 3/1974 | Knapp et al. . |
| 3,822,486 | 7/1974 | Knapp et al. . |
| 3,824,709 | 7/1974 | Knapp et al. . |
| 3,826,019 | 7/1974 | Knapp et al. . |
| 4,197,670 | 4/1980 | Cox . |
| 4,411,629 | 10/1983 | Voights . |
| 5,004,442 | 4/1991 | Lemelson et al. . |
| 5,104,328 | 4/1992 | Lounsbury . |
| 5,207,728 | 5/1993 | Fogarty et al. . |
| 5,209,345 | 5/1993 | Haugabook .................. 446/73 X |
| 5,256,098 | 10/1993 | Smith et al. . |
| 5,308,277 | 5/1994 | Nielsen ........................ 446/320 |

FOREIGN PATENT DOCUMENTS 2060412  6/1980  United Kingdom .

*Primary Examiner*—Jeffrey A. Smith

[57] ABSTRACT

A set of dolls for educational and play purposes in the image of a human gametes and human fetuses. The doll can be provided singly to portray one particular state of human development, or multiple dolls can be provided in a variety of stages of development, to portray continual development in the fertilization stage and first through third trimesters of development.

18 Claims, 5 Drawing Sheets

5,672,058

HUMAN PRE-NATAL DEVELOPMENT DOLLS

This application is a continuation-in-part of our prior application Ser. No. 08/352,873, filed Dec. 12, 1994 (abandoned).

FIELD OF THE INVENTION

This invention relates generally to play and educational toys and in particular to dolls.

Dolls have always represented an excellent way to teach and educate youngsters while affording youngsters a way to play and amuse themselves. When a youngster plays with a doll, their senses, awareness, knowledge and perceptions are stimulated, as well as their imaginations. For many years, of course, dolls have been created that are intended to simulate young children and babies, On a limited scale, dolls of fetuses at or near term have been created to aid in the education and training of the childbirth process, for example U.S. Pat. No. 4,411,629 issued to Voights, as a way of teaching palpation and auscultation of a fetus in a pregnant female. However, there has not been one or more dolls that to any realistic extent portrays the pre-natal development of humans at any significantly earlier stage of development than the fetal stage or at or near term. In particular, there have been no known dolls of pre-fetal stages such as embryos stage or earlier, or of pre-fertilization stage. The present invention meets this need by providing various stages of development, from pre-fertilization gametes, to zygotes, to embryos, and through fetuses to term. When considered together, the dolls of the present invention can show or teach this development. A strong, positive educational impression can be made, conveying the importance of how quickly fertilization progresses and how the embryo and then the fetus achieves human form with human characteristics.

SUMMARY OF THE INVENTION

In summary, the invention is, in one of its preferred embodiments, a doll for play or educational purposes, comprising a manufactured doll having an exterior appearance sufficient to portray a human gamete, zygote, embryo or fetus, being in a stage of development during human pregnancy, at a point ranging from pre-fertilization to a point prior to full term. An alternative embodiment of the invention comprises a set of dolls for play or educational purposes, comprising a set of dolls having differing exterior appearances sufficient to portray a human development sequence from gamete stage prior to fertilization through progressively different states of development during human pregnancy at a set of points prior to full term.

DESCRIPTION OF THE PREFERRED EMBODIMENTS

Figure 1:
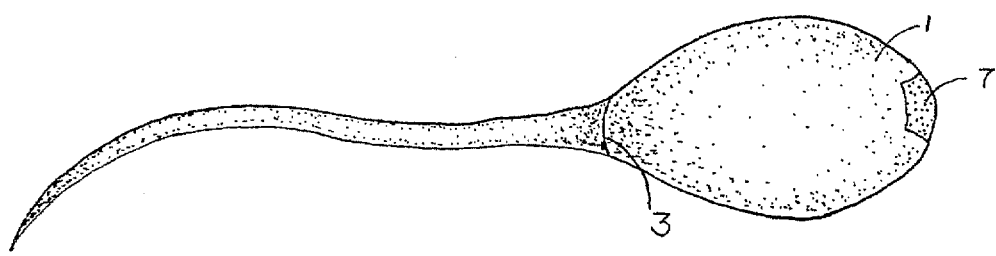
FIG. 1 is a side elevational view of a human sperm doll.
Figure 2:
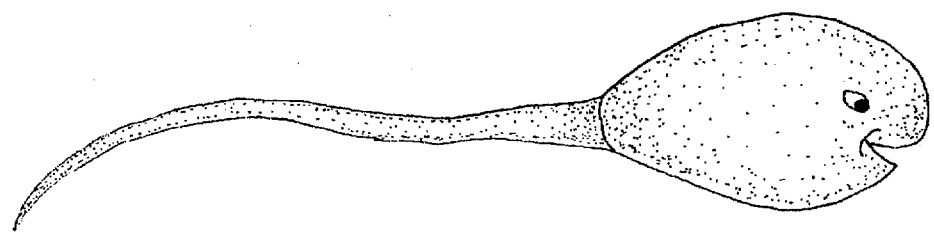
FIG. 2 is a side elevational view of an alternative embodiment of a human sperm doll.
Figure 3:
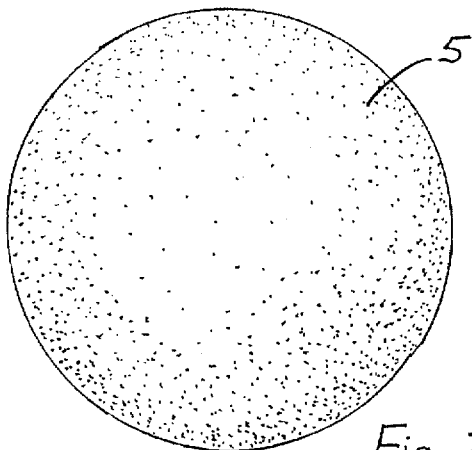
FIG. 3 is a side elevational view of a human egg doll.
Figure 4:
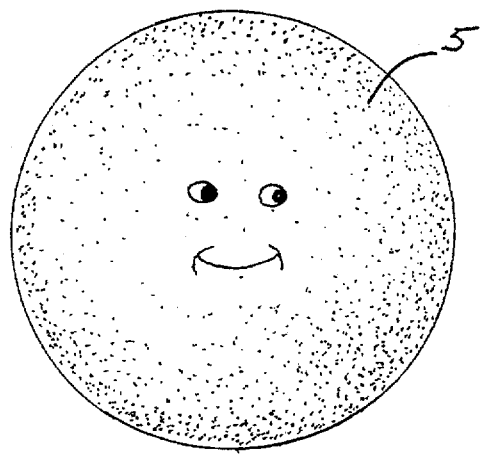
FIG. 4 is a side elevational view of an alternative embodiment of a human egg doll.

The human pre-natal development dolls of the present invention take as their models stages of human development including human gametes, zygotes, blastulas, gastrulas, morulas, embryos and fetuses at times of from just prior to fertilization to a time just prior to birth. Human gametes comprise a sperm and an egg or ovum, and dolls representing them are shown respectively in FIGS. 1, 2, 3 and 4. These dolls are meant to clearly show a separate and distinct stage in the complete development process. FIGS. 1 and 2 show a human sperm 1, having a detachable tail 3, which is an aid in depicting the loss of the sperm's tail after the sperm fertilizes a human ovum or egg 5. An additional feature of the sperm doll is a piece of Velcro®-type cloth 7 that permits the depiction of a sperm becoming fastened onto an egg, when the dolls are constructed of cloth, as disclosed further below.

Figure 5:
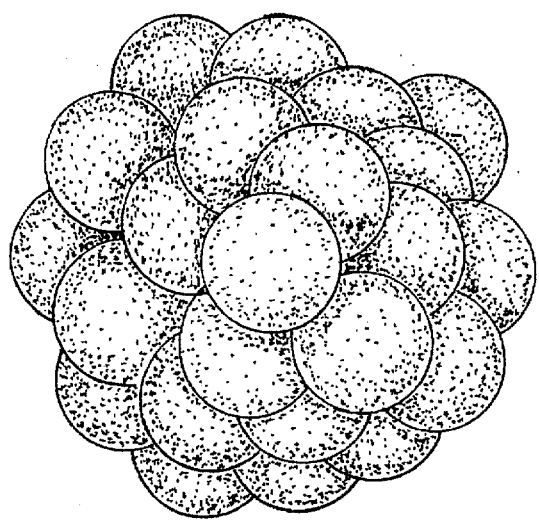
FIG. 5 is a side elevational view of a human fertilized zygote doll.
Figure 6:
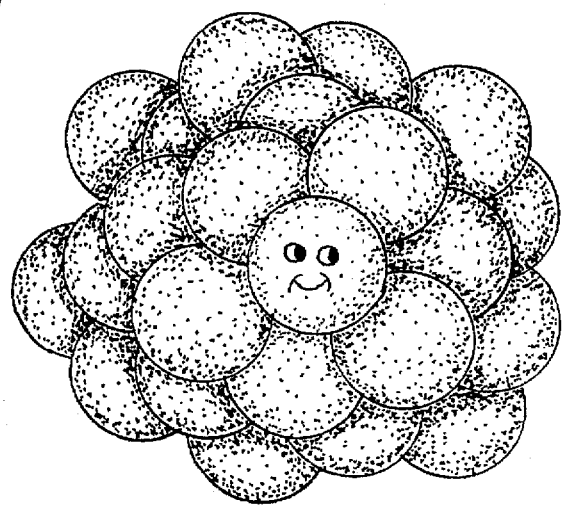
FIG. 6 is a side elevational view of an alternative embodiment of a human fertilized zygote doll.
Figure 7:
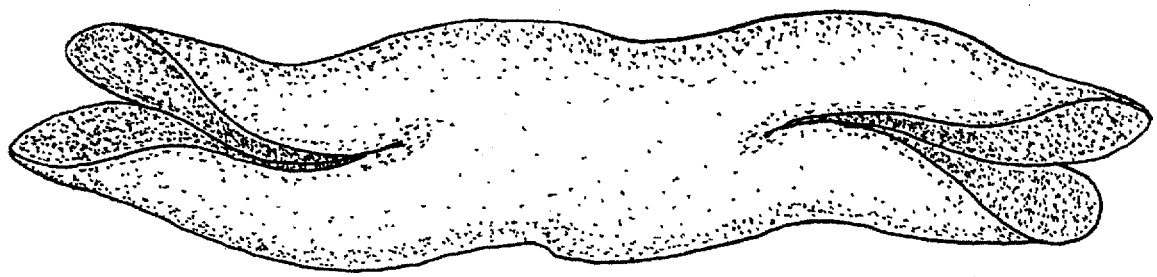
FIG. 7 is a side elevational view of a human embryo at an early embryonic stage showing early bilateral development of a neural tube.

In the next distinct stage, a zygote is the fertilized egg that has undergone one or more cycles of undifferentiated cellular reproduction, slowly taking on a spherical shape, as illustrated by the dolls in FIGS. 5 and 6. Beyond the initial zygote stage, development progresses through blastula, gastrula and morula stages, depictions of which are also part of the invention as claimed.

While the differentiation between the gamete stage and the zygote stage is readily apparent, it is important to know that there is also a differentiation between the embryo and fetus stage. Embryos and fetuses are differentiated by those of skill in the art such that up to eight weeks, the developing organism is classified as an embryo and after eight weeks, it is classified as a fetus. See *A Child Is Born*, Lennart Nilsson, Dell Publishing, New York, 1993 at page 91, the entire disclosure of which is incorporated herein by reference. Differentiation between development stages is very important in the practice of the invention. The differentiation between the embryo and fetus stages in the dolls is critical to the education of the user of the dolls in order to teach this recognized dichotomy of development stages.

Figure 8:
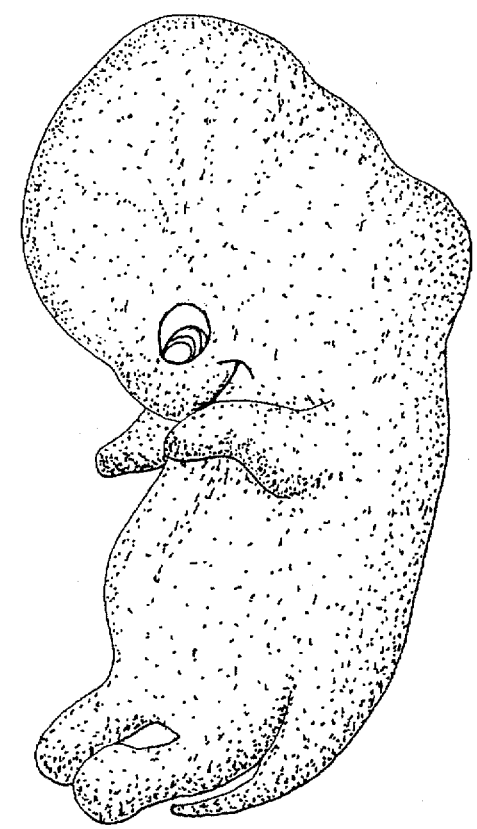
FIG. 8 is a side elevational view of an embryo doll at days 40 to 42 of development.
Figure 9:
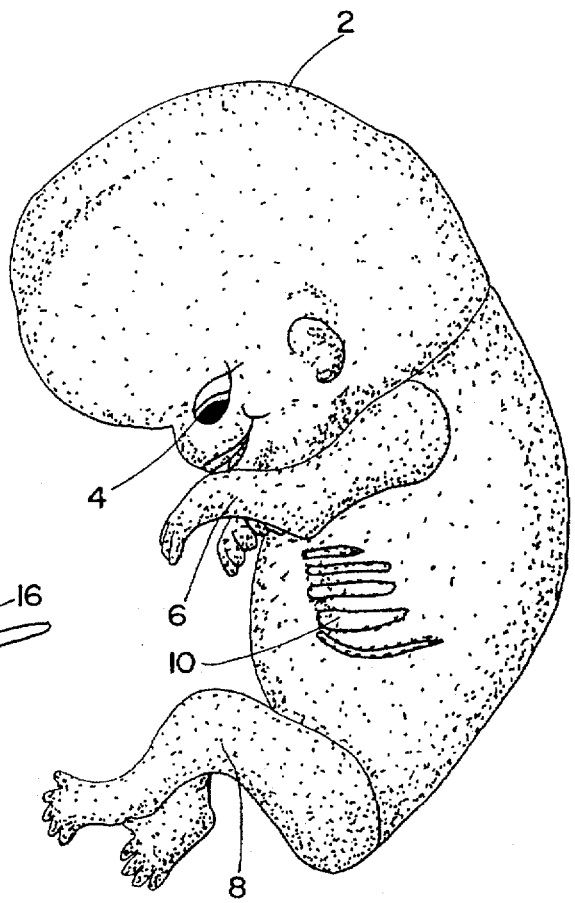
FIG. 9 is a side elevational view of an embryo doll at days 44 to 46 of development.

In an embryo of up to day thirty-nine, the face is not generally recognizable as human. However, since one object of the invention is to provide dolls for play, stylized faces can be built-in features of dolls of the human sperm, egg and zygote, as is shown in the drawings of this specification. As can be seen in FIG. 8, there are few features suggestive of a human at days forty to forty two of gestation, although the earliest indication suggestive of a human face develops over a continuum of days forty to forty-six of gestation. A fetal doll that can more accurately portray a human face would be an image at days forty four to forty six, as shown at FIG. 9. There, such features become visible as head 2, eyes 4, arms 6 and legs 8. Also the first faint outline of bones such as ribs 10 can be seen.

Figure 10:
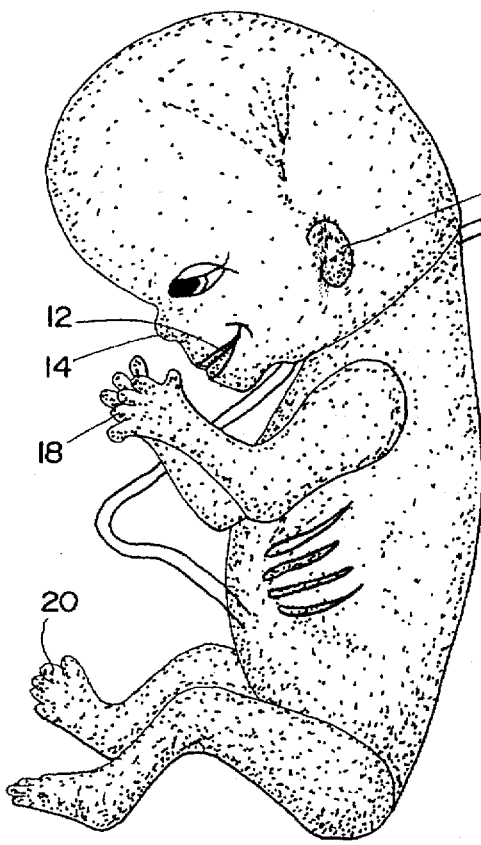
FIG. 10 is a side elevational view of a fetus doll at the ninth week of development.

By the time of the 9th week of development, as shown by the doll in FIG. 10, there can be seen a clearly demarcated mouth 12 and nose 14 and a bud that can be recognized as an ear 16. Although not illustrated, fingernails also appear at about this time. Also at this time, well separated fingers 18 and toes 20 are present.

Figure 11:
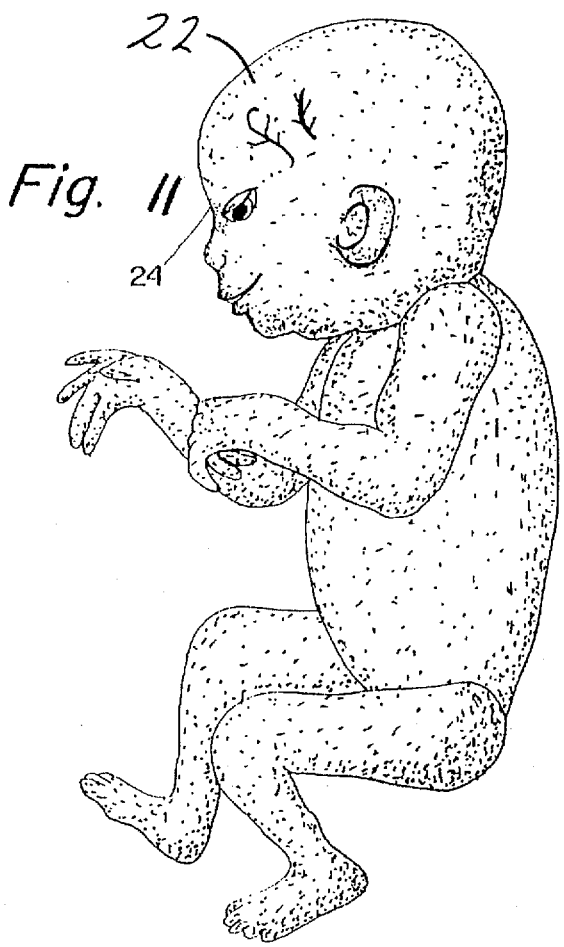
FIG. 11 is a side elevational view of a fetus doll at the thirteenth week of development.
Figure 12:
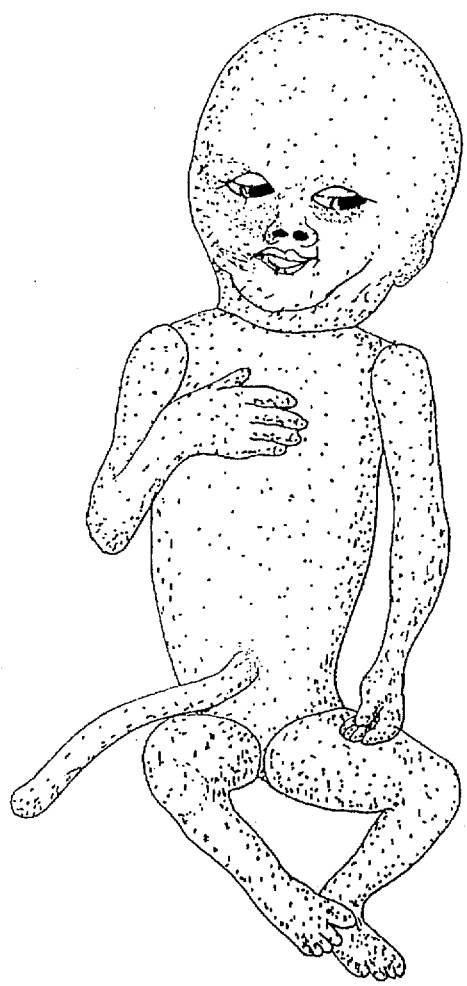
FIG. 12 is a perspective view of a fetus doll at the sixteenth week of development.
Figure 13:
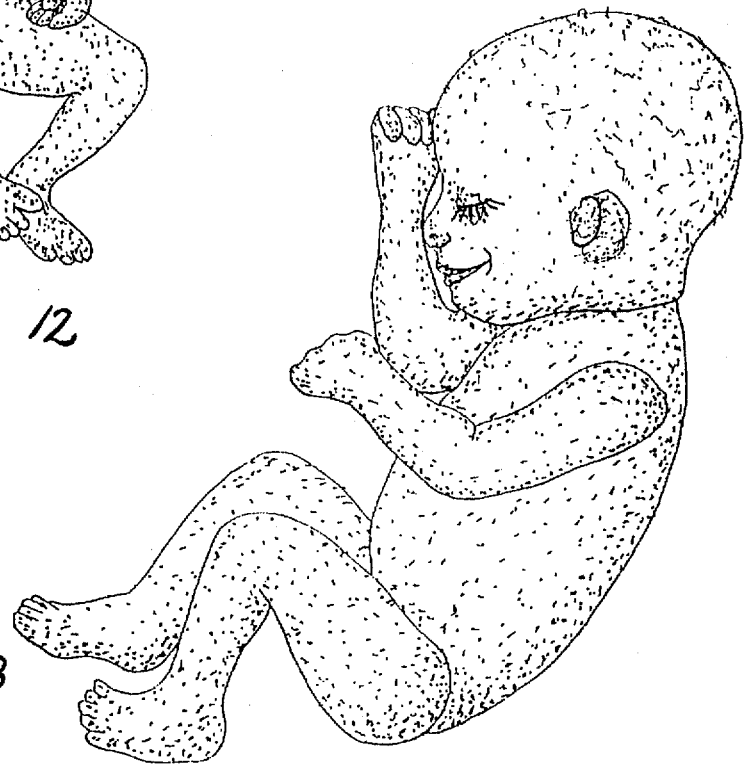
FIG. 13 is a front elevational view of a fetus doll at the sixteenth week of development.
Figure 14:
FIG. 14 is a side elevational view of a fetus doll at the twentieth week of development.
Figure 15:
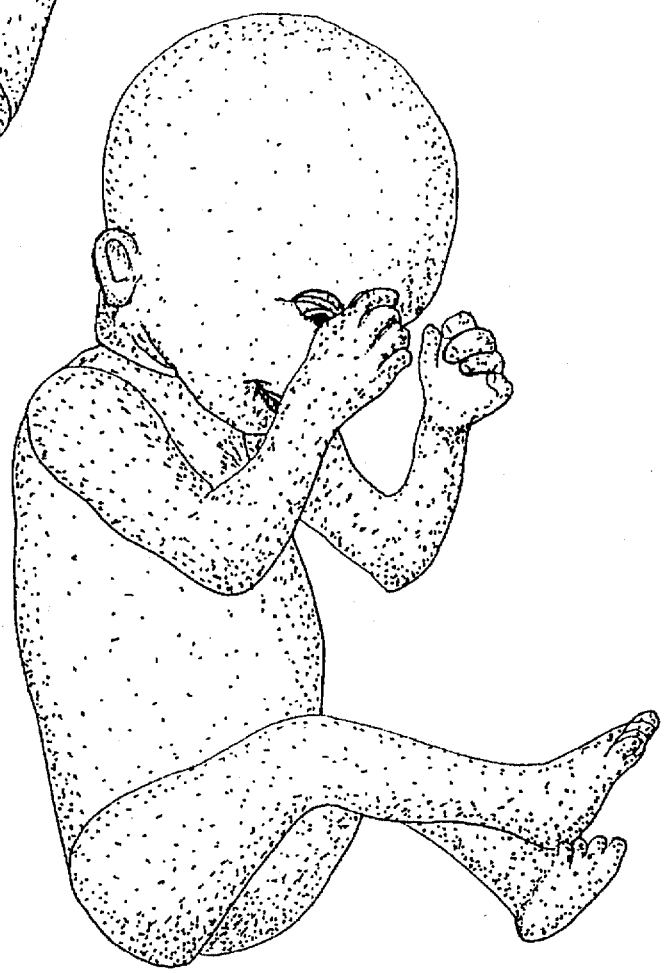
FIG. 15. is a side elevational view of a fetus doll at the twenty-sixth week of development.

By week 13, as shown in FIG. 11, blood vessels are easily distinguished, especially in the region of the head 22. At this time, the fetus may be sucking its thumb, which is readily achievable in the dolls of the present invention by means of articulated joints of the kind well known in the toy art. By week 20 as shown in FIG. 14, even eyebrows 24 are well developed. Although the models for the dolls of the present invention are human gametes and embryos in various stages of development, it should be recognized that the invention is not that of a doll taken from a human in any one point of the development process, so none of the specific features of embryos at given times of development is to be taken as limiting the invention.

The dolls of the present invention are preferably manufactured either of stuffed sewn cloth by methods well know to those of ordinary skill in the doll art, or elastomeric polymers that can readily take on any desired skin tone colorant. Such polymers are well known to those of skill in the polymer arts, and can be easily molded or replicated into any image at any point of the development porches. Alternatively, the dolls can be fabricated of soft closed cell foam-type polymers or can be constructed so as to have a cloth outer covering. Alternative materials include porcelain, pewter and precious metals. For educational purposes, the dolls can be colored as previously noted, and different racial developmental features can be molded or sewn in as well. Certain types of birth defects can be exemplified, as well as developmental abnormalities, such as the occurrence of Siamese twins. Any one of the dolls can be provided with toy doll eyes, of the type well known in the toy industry, and can be further equipped with eyelids, including those of the variety that can open and close with the motions of the doll so that the eyelids would be open when the doll is in a substantially upright position, and closed when the doll in a substantially horizontal position. The dolls can be provided with an umbilical cord, which can be permanently or removeably attached, as by use of a snap or Velcro®-like material. External genitalia can be present of absent in one or all of the dolls. The dolls can have articulated joints that can assume different fixed positions, using internal joint mechanisms well known to those of ordinary skill in the manufacture of dolls. The dolls are generally not to scale, since fetuses in the early states, like days 44 to 46, are only about 27 millimeters from the crown of the head to the bottom of the rump.

The following non-limiting manufacturing example is provided. A model is placed in proper position on a table and a molding material comprising Silastic A®, available from Dow Corning Co. is mixed and poured over the body from the knee line to the breast line. After this material is set up to provide an initial mold, a second layer comprising Silastic B® material is poured on the initial mold to add strength, and a plaster embossed cloth is applied over the layer of Silastic B to add rigidity to the thus formed initial mold. When the materials are sufficiently cured the initial mold having an open lower portion, where the model is resting on the table, is then removed from the model. The interior of this initial mold is than painted with a creamy latex coating, which when removed from the initial mold, and suitably reinforced, will serve as a hollow positive mold. This hollow mold is then shaped to provide the same proportions as those of the live model and a negative mold of plaster material, such as Microstone® is cast around the outer surface of the shaped positive latex mold while lying upon a flat base. Thereafter, the latex positive mold is removed from the negative mold and the doll constructed as follows. First a skin colored natural latex rubber such as cis isoprene available from the Firestone Company as F4-Latex® is mixed with a suitable catalyst dispersion material and with silicone antifoam, and in painted on the interior surfaces of the negative mold to provide a skin for the doll. Then the plaster mold is painted with a bonding agent, such as a polyurethane activated coating, and a thin shoot of polyurethane foam which has been treated in a sodium hydroxide solution is placed in firm contact with the skin. A layer of polyvinyl chloride gel is deposited upon the foam sheet to simulate adipose tissue. The skin is then bonded to the foam. This example is not to be taken as limiting the invention to the above disclosed procedure, which is exemplary in nature only.

While the invention has been described and illustrated with reference to certain preparative embodiments thereof, those skilled in the art will appreciate that various changes, modifications and substitutions can be made therein without departing from the spirit and scope of the invention. It is to be particularly noted that although only a relatively limited number of drawings are given to illustrate a limited number of development times before and during pregnancy, that human development is a constant process and that the invention is of dolls through a continuous range of the development process. The claims are thus not to be limited to only those discrete points in the development process actually illustrated here.

What is claimed is:

1. A set of dolls for play or educational purposes, comprising a plurality of dolls comprising at least one doll for portraying a human gamete or at least one doll for portraying a human zygote, and at least one doll for portraying a human embryo, each of said plurality of dolls having a differing exterior appearance from others of said plurality of dolls, having differing exterior appearances sufficient to portray a human pre-natal development sequence from gamete stage prior to fertilization through progressively different states of development during human pregnancy at a set of points prior to full term.

2. The set as claimed in claim 1, wherein said set includes a doll which portrays a human sperm.

3. The doll as claimed in claim 2, which further comprises a detachable tail.

4. The doll as claimed in claim 2, which further comprise means for attaching said doll which portrays a human sperm to another doll which portrays a human egg.

5. The set as claimed in claim 1, wherein said set includes a doll which portrays a human egg.

6. The set as claimed in claim 1, wherein said set includes a doll which portrays a fertilized human zygote.

7. The set as claimed in claim 1, wherein said set includes a doll which portrays a human pre-embryo selected from the group consisting of morula, blastula or gastrula stage.

8. The set as claimed in claim 1, wherein said set includes a doll which portrays a human embryo, being in a stage of development during the sixth week of pregnancy.

9. The set as claimed in claim 1, wherein said set includes a doll which portrays a human embryo, being in a stage of development during the seventh week of pregnancy.

10. The set as claimed in claim 1, wherein said set includes a doll which portrays a human embryo, being in a stage of development during the eighth week of pregnancy.

11. The set as claimed in claim 1, wherein said set includes a doll which portrays a human fetus, being in a stage of development during the ninth week of pregnancy.

12. The set as claimed in claim 1, wherein said set includes a doll which portrays a human fetus, being in a stage of development during the tenth week of pregnancy.

13. The set as claimed in claim 1, wherein said set includes a doll which portrays a human fetus, being in a stage of development during the twelfth week of pregnancy.

14. The set as claimed in claim 1, wherein said set includes a doll which portrays a human fetus, being in a stage of development during the thirteenth week of pregnancy.

15. The set as claimed in claim 1, wherein said set includes a doll which portrays a human fetus, being in a stage of development during the sixteenth week of pregnancy.

16. The set as claimed in claim 1, wherein said set includes a doll which portrays a human fetus, being in a stage of development during the twentieth week of pregnancy.

17. The set as claimed in claim 1, wherein said set includes a doll which portrays a human fetus, being in a stage of development during the twenty sixth week of pregnancy.

18. The set as claimed in claim 1, wherein said set includes a doll which portrays a human fetus, being in a stage of development during the thirty sixth week of pregnancy.

* * * * *